US009214193B2

(12) United States Patent
Kiriyama

(10) Patent No.: US 9,214,193 B2
(45) Date of Patent: Dec. 15, 2015

(54) PROCESSING APPARATUS AND METHOD FOR DETERMINING AND REPRODUCING A NUMBER OF IMAGES BASED ON INPUT PATH INFORMATION

(75) Inventor: Sawako Kiriyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 345 days.

(21) Appl. No.: 13/350,431

(22) Filed: Jan. 13, 2012

(65) Prior Publication Data

US 2012/0229503 A1    Sep. 13, 2012

(30) Foreign Application Priority Data

Mar. 8, 2011   (JP) .................................. 2011-050475

(51) Int. Cl.
| | | |
|---|---|---|
| *G09G 5/00* | (2006.01) | |
| *G06F 3/0484* | (2013.01) | |
| *G06F 3/0488* | (2013.01) | |
| *G11B 27/10* | (2006.01) | |
| *G11B 27/34* | (2006.01) | |
| *G11B 27/034* | (2006.01) | |

(52) U.S. Cl.
CPC ............ *G11B 27/34* (2013.01); *G06F 3/04845* (2013.01); *G06F 3/04883* (2013.01); *G11B 27/034* (2013.01); *G11B 27/105* (2013.01)

(58) Field of Classification Search
CPC ............ G06F 3/04845; G06F 3/04883; G11B 27/034; G11B 27/105; G11B 27/34
USPC ......................................................... 345/629
See application file for complete search history.

(56) References Cited

U.S. PATENT DOCUMENTS

| | | | |
|---|---|---|---|
| 7,355,620 B2* | 4/2008 | Ikehata et al. ............. | 348/14.03 |
| 2003/0063133 A1 | 4/2003 | Foote et al. | |
| 2004/0051700 A1* | 3/2004 | Pensjo ........................... | 345/173 |
| 2007/0035639 A1 | 2/2007 | Aridome et al. | |
| 2007/0110338 A1* | 5/2007 | Snavely et al. ............... | 382/305 |
| 2008/0086468 A1* | 4/2008 | Jing et al. ........................... | 707/5 |
| 2008/0240672 A1* | 10/2008 | Ikeda et al. ..................... | 386/52 |
| 2010/0083117 A1 | 4/2010 | Matsumoto | |

FOREIGN PATENT DOCUMENTS

| | | |
|---|---|---|
| JP | 2003-180895 | 7/2003 |
| JP | 2004-104594 | 4/2004 |
| JP | 2007-158603 | 6/2007 |

(Continued)

OTHER PUBLICATIONS

Extended European Search Report issued Jun. 4, 2013 in Patent Application No. 12157687.0.

(Continued)

*Primary Examiner* — Mark Zimmerman
*Assistant Examiner* — Sohum Kaji
(74) *Attorney, Agent, or Firm* — Oblon, McClelland, Maier & Neustadt, L.L.P.

(57) ABSTRACT

An apparatus includes a display controller, a detecting unit, and a reproduction unit. The display controller is configured to control a display unit to display marks corresponding to a plurality of images. The detecting unit is configured to detect selection information entered by a user. The selection information includes path information and additional information. The reproduction unit is configured to reproduce at least one of the plurality of images based on the additional information.

20 Claims, 8 Drawing Sheets

(56) References Cited

FOREIGN PATENT DOCUMENTS

| JP | 2007-158603 A | 6/2007 |
| JP | 2009-260691 | 11/2009 |
| JP | 2010-028523 | 2/2010 |
| JP | 2010-87647 | 4/2010 |
| JP | 2010-087647 | 4/2010 |
| JP | 2010-198310 | 9/2010 |
| JP | 2010-250768 | 11/2010 |

OTHER PUBLICATIONS

Japanese Office Action issued Nov. 25, 2014 in corresponding Japanese Patent Application No. 2011-050475 (3 pages).

* cited by examiner ics or moving images. Below, description is given of the
PROCESSING APPARATUS AND METHOD FOR DETERMINING AND REPRODUCING A NUMBER OF IMAGES BASED ON INPUT PATH INFORMATION

CROSS REFERENCE TO RELATED APPLICATIONS

The present disclosure claims priority to under 35 U.S.C. §119 and contains subject matter related to that disclosed in Japanese Priority Patent Application JP 2011-050475 filed in the Japan Patent Office on Mar. 8, 2011, the entire contents of which are hereby incorporated by reference.

BACKGROUND

The present disclosure relates to a reproduction processing apparatus, an imaging apparatus, a reproduction processing method, and a program recorded on a non-transitory computer readable medium.

As imaging apparatuses, for example, digital still cameras and video cameras capable of reproducing imaged data are common. In these kinds of imaging apparatuses, in the case of reproducing desired image data from a large amount of image data imaged in the past, the image data were selected after designating the date and time of the image or the like.

In this respect, imaging apparatuses capable of measuring a position have increased along with the development of GPS technology in recent years. These kinds of imaging apparatuses attach and save position information regarding the latitude, longitude and the like of the location where the image data were imaged. In this manner, using the position information attached to the image data, it has become possible to select data desired to be reproduced from the imaging location.

Japanese Unexamined Patent Application Publication No. 2010-87647 is an example of the above-described related art.

SUMMARY

However, in the above method, there is a problem in that, for example, in a case where image data imaged at the same imaging location exist, all of the image data end up being reproduced and it is difficult to reproduce only the image data that the user wishes to reproduce. Further, when a plurality of image data is selected, there is a problem in that it takes a long time to reproduce all the image data and the desired scenes are not readily reproduced.

It is desirable to provide a new and improved reproduction processing apparatus, an imaging apparatus, a reproduction processing method and a program which are capable of image data selection better reflecting the intentions of a user when selecting image data as a reproduction target.

The present invention broadly comprises apparatus, method, and a non-transitory computer readable medium encoded with a program. An apparatus according to one embodiment of the invention includes a display controller, a detecting unit, and a reproduction unit. The display controller is configured to control a display unit to display marks corresponding to a plurality of images. The detecting unit is configured to detect selection information entered by a user. The selection information includes path information and additional information. The reproduction unit is configured to reproduce at least one of the plurality of images based on the additional information. According to the embodiments of the disclosure described above, it is possible to perform image data selection better reflecting the intentions of a user, when selecting image data of a reproduction target.

DETAILED DESCRIPTION OF EMBODIMENTS

Figure 1:
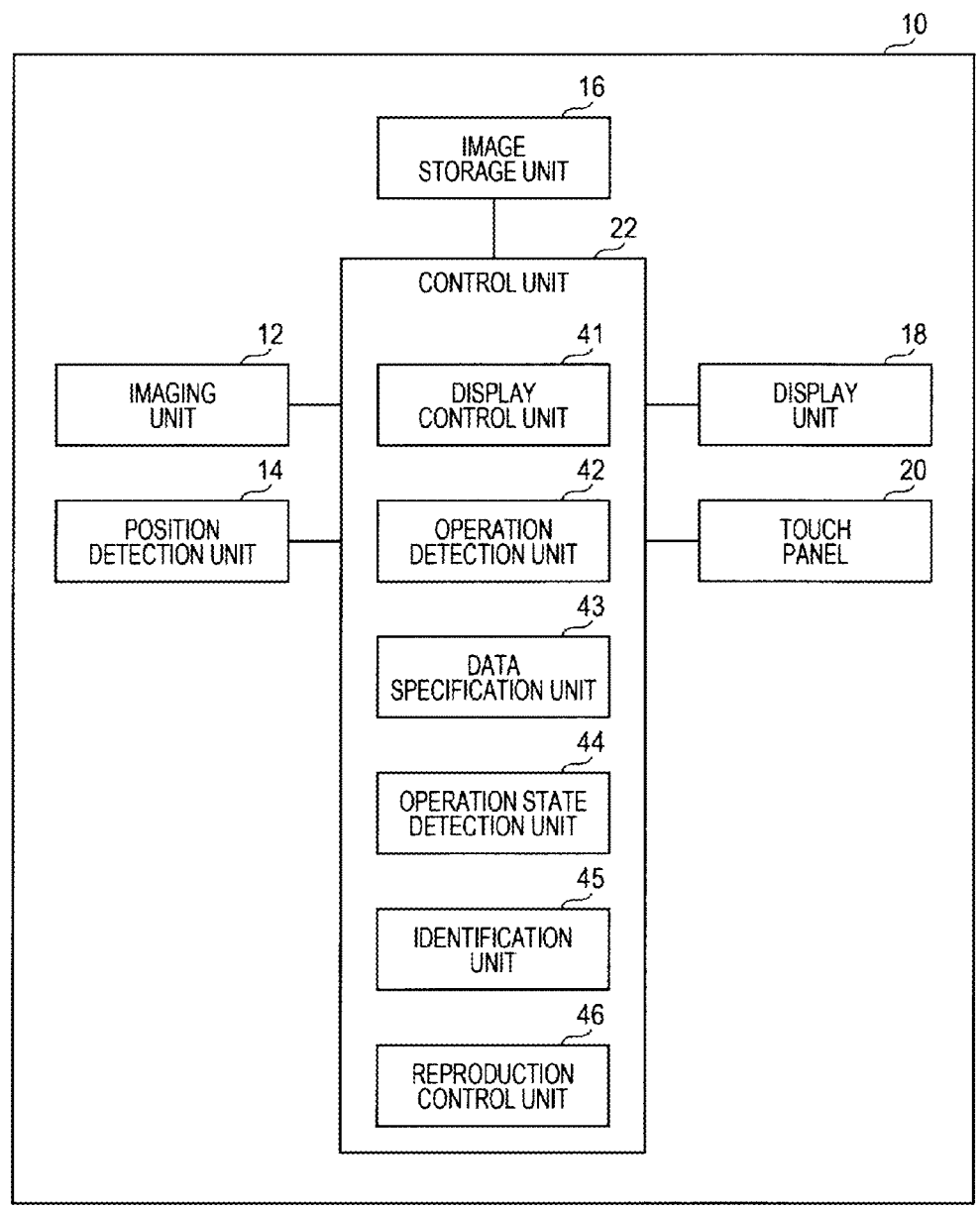
FIG. 1 is a block diagram illustrating a configuration of an imaging apparatus.

Next, the embodiments of the disclosure will be described in detail with reference to the attached figures. Here, in the specification and figures, constituent elements having substantially the same function and configuration will be described with the same reference numerals and overlapping description thereof will be omitted.

The description will be given in the following order.
1. Configuration of imaging apparatus related to the embodiment
2. Selection method based on the location where the image data of the reproduction target was imaged
2-1. Selection method of image data related to a comparative example
2-2. Selection method of image data related to the embodiment
3. Reproduction process of imaging data linked to the speed of a tracing operation when imaging data selection
4. Effectiveness of the imaging apparatus related to the embodiment
5. Other embodiments
<1. Configuration of Imaging Apparatus Related to the Present Embodiment>

In the embodiment, an imaging apparatus 10 is provided as an example of an image processing apparatus and in regard to the configuration of the imaging apparatus 10, description will be given with reference to FIG. 1. FIG. 1 is a block diagram illustrating a configuration of an imaging apparatus 10.

The imaging apparatus 10 may be, for example, a digital still camera or a digital video camera capable of imaging still images or moving images. Below, description is given of the imaging apparatus 10 as a digital video camera. The imaging apparatus 10 has not only an imaging function, but also functions of storing and reproducing imaged imaging data (moving images).

As illustrated in FIG. 1, the imaging apparatus 10 includes an imaging unit 12, a position detection unit 14, an image storage unit 16 which is an example of a storage unit, a display unit 18, a touch panel 20 which is an example of an input unit, a control unit 22, and the like.

The imaging unit 12 is for imaging a subject and generating an image signal (image data). The imaging unit 12 includes various lenses and an imaging device. The imaging device is an example of a photoelectric conversion element and is configured by a plurality of elements capable of photoelectric conversion converting incident optical information passing through a lens into an electric signal. Each element generates electric signals in response to the quantity of light received. As imaging devices, a CCD (Charge Coupled Device) image sensor, a CMOS (Complementary Metal Oxide Semiconductor) image sensor and the like may be used. Here, the image data generated by the imaging unit 12 are sent to the control unit 22 and image processes such as light quantity gain compensation and white balance adjustment are performed.

The position detection unit 14 has, for example, a GPS (Global Positioning System) function and is for detecting the position (latitude and longitude) of the imaging apparatus 10. For example, the position detection unit 14 detects the imaging position of the imaging apparatus 10 at a time when the imaging unit 12 imaged a subject. The detected imaging position information is associated with and appended to the imaged and generated image data (imaging data).

The image storage unit 16 stores reproducible imaging data imaged by the imaging unit 12. In the embodiment, the image storage unit 16 associates imaging position information detected by the position detection unit 14 with and stores the imaging data. Further, the image storage unit 16 associates an imaging date and time measured by a timer (not shown) with and stores the imaging data. The image storage unit 16 may be a recording medium such as a memory card, or may be internal memory.

The display unit 18 displays various kinds of imaging data (moving images and still images). Further, the display unit 18 displays a selection screen (a map screen to be described later) for selecting imaging data of a reproduction target in the imaging data stored in the image storage unit 16. In the embodiment, the display unit 18 displays reproducible imaging data, which are stored in the image storage unit 16, on the selection screen so as to be selectable based on various items of imaging position information.

The touch panel 20 is provided so as to be superimposed on the display screen of the display unit 18 and receives a touch operation of a finger of a user through an operation body on a display screen. The touch panel 20, for example, receives a selection operation (tracing operation) by a user regarding the imaging data displayed on the selection screen. Here, in the embodiment, the touch panel 20 receives the imaging data selection according to a series of tracing operations by a user on a display unit 18 when selecting imaging data on the selection screen.

The control unit 22 is for controlling the respective units of the imaging apparatus 10. The control unit 22 is configured of a CPU, a RAM, a ROM, and the like, which are not shown. A program for making the control unit 22 execute various types of control is stored in the ROM. The CPU operates based on the program stored in the ROM and performs calculation processes and the like for various controls while using the RAM. For example, the control unit 22 performs image processing or the like on the imaging data sent from the imaging unit 12 and stores the data in the image storage unit 16.

Further, on the display unit 18, the control unit 22 reproduces imaging data selected using the touch panel 20 from among the imaging data stored in the image storage unit 16. In order to perform the selection and reproduction of the imaging data, the control unit 22 includes a display control unit 41, an operation detection unit 42, a data specification unit 43, an operation state detection unit 44, an identification unit 45, and a reproduction control unit 46, as shown in FIG. 1.

The display control unit 41 controls the display of the display unit 18. The display control unit 41 displays the plurality of imaging data stored in the image storage unit 16 on the display unit 18 with selection screens which are individually selectable based on the respective imaging position information.

The operation detection unit 42 detects a touch operation by a finger of a user on the touch panel 20. For example, when a touch operation is performed when the selection screen is displayed on the display unit 18, the operation detection unit 42 receives a signal corresponding to the touch operation from the touch panel 20 and detects a tracing operation by a user.

The data specification unit 43 sets the selection range of the imaging data of the reproduction target from inside the selection screen, based on the tracing operation (selection operation) detected by the operation detection unit 42. By setting the selection range, the data specification unit 43 specifies the imaging data of the reproduction target from among the plurality of imaging data displayed on the display unit 18.

The operation state detection unit 44 detects the operation state at the time that the user performed the tracing operation of the imaging data specified by the data specification unit 43. For example, the operation state detection unit 44 detects the movement speed of the series of tracing operations as the operation state. The operation state detection unit 44 may also detect the average speed (average movement speed) of the tracing operations.

The identification unit 45 identifies a first operation portion (slowly traced portion) having a slow movement speed and a second operation portion (quickly traced portion) having a fast movement speed, from the series of tracing operations. Here, identification is performed by division into two portions; however, identification may be performed by division into three or more portions.

The reproduction control unit 46 controls the reproduction of the specified imaging data, based on the operation state detected by the operation state detection unit 44. Specifically, the reproduction control unit 46 controls the reproduction of the specified imaging data, based on the speed of the tracing operation (average speed) detected by the operation state detection unit 44.

For example, the reproduction control unit 46 lengthens the reproduction time of each item of the specified imaging data when the average speed is slow and shortens the reproduction time of each item of the specified imaging data when the average speed is fast. Further, from among the two or more specified imaging data items, the reproduction control unit 46 reproduces the imaging data with an old date and time when the average speed is slow and reproduces the imaging data with a recent date and time when the average speed is high.

Further, the reproduction control unit 46 divides and controls the reproduction of the imaging data corresponding to the first operation portion identified by the identification unit 44 from among the specified imaging data (two or more imaging data items) and the reproduction of the imaging data corresponding to the second operation portion.

For example, the reproduction control unit 46 reproduces the imaging data corresponding to the first operation portion identified by the identification unit 45 from among the specified two or more imaging data items ahead of reproducing the imaging data corresponding to the second operation portion. Further, the reproduction control unit 46 makes the reproduction time of the imaging data corresponding to the first operation portion identified by the identification portion 45 from among the specified two or more imaging data items longer than the reproduction time of the imaging data corresponding to the second operation portion.

<2. Selection Method Based on the Location where the Image Data of the Reproduction Target was Imaged>

As described above, the imaging apparatus 10 is capable of detecting the imaging position when imaging a subject. Thus, the imaging apparatus 10 may select and reproduce desired data from among imaging data using the imaging position information.

Here, description will be given of a selection method of selecting imaging data to be reproduced according to the imaging location from among the data imaged by the imaging apparatus 10. Below, description will be given of a selection method of image data relating to a comparative example and then a selection method of image data relating to the embodiment.

(2-1. Selection Method of Image Data Related to a Comparative Example)

Figure 2:
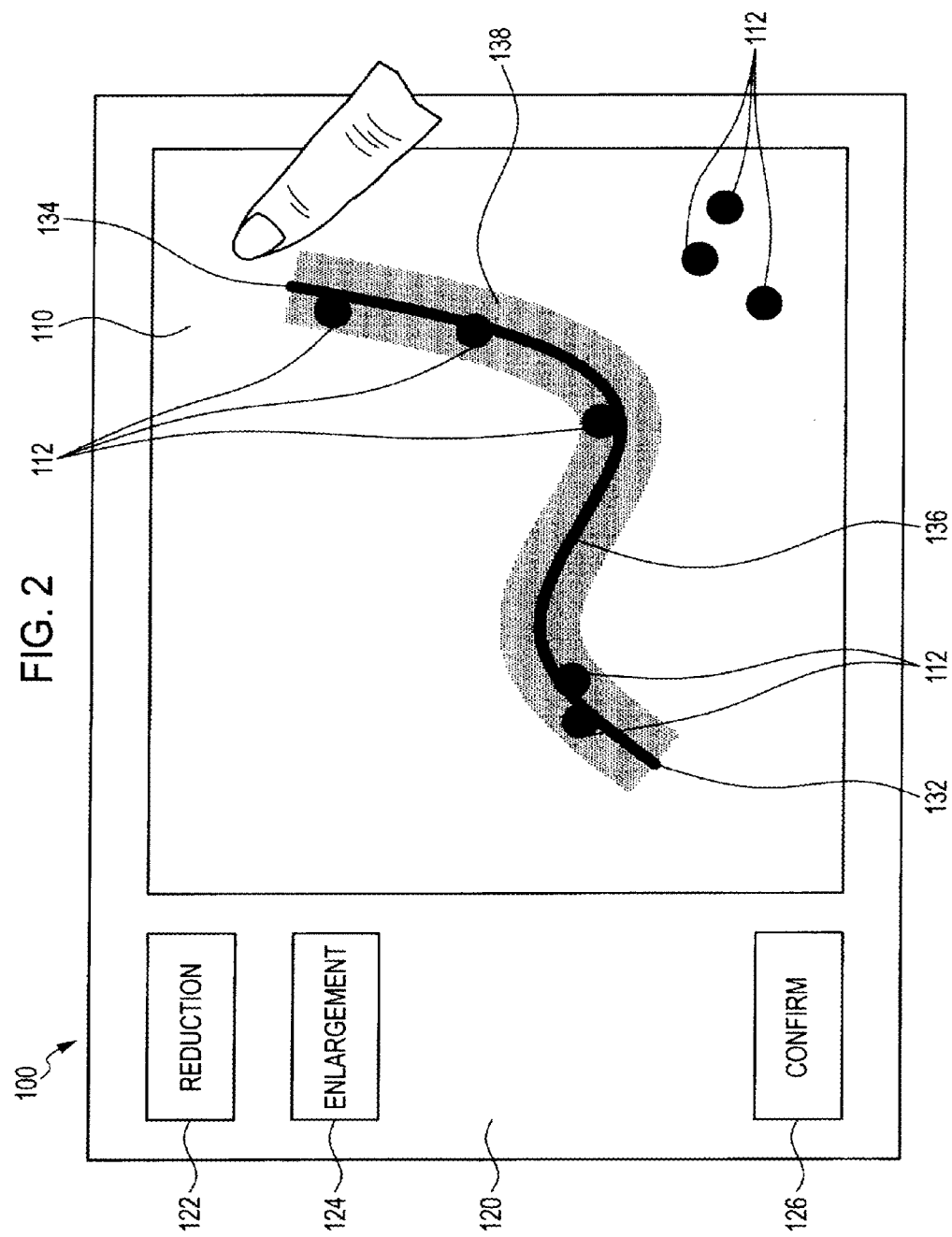
FIG. 2 is a view illustrating a selection screen relating to a first comparative example.
Figure 3:
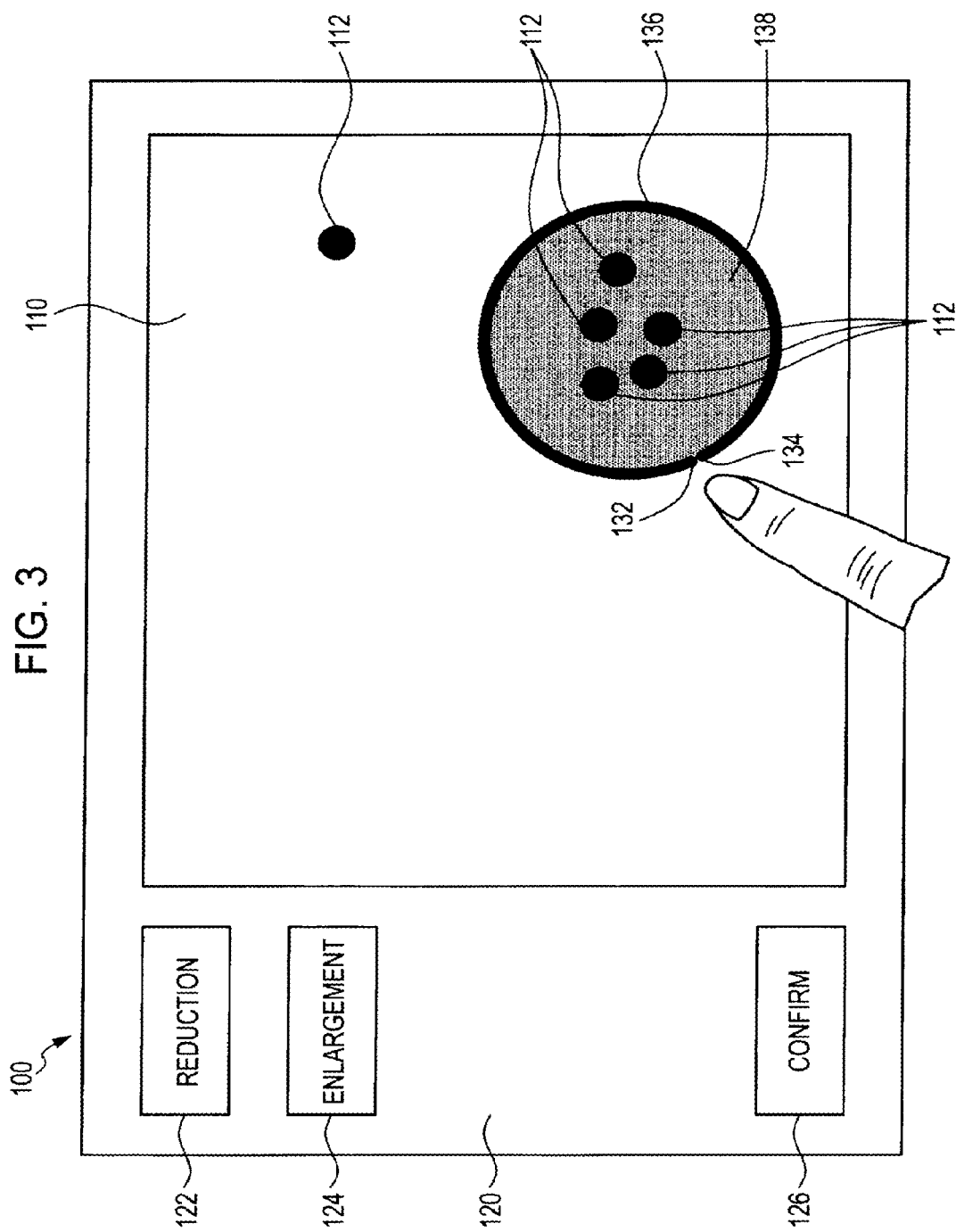
FIG. 3 is a view illustrating a selection screen relating to a second comparative example.

Referring to FIGS. 2 and 3, description will be given of a selection method of imaging data related to a comparative example. FIG. 2 is a view illustrating a selection screen relating to a first comparative example.

First, description will be given regarding the screen configuration of the selection screen 100 illustrated in FIG. 2. The selection screen 100 is divided into a map area 110 and an operation button area 120. A touch panel is superimposed on the selection screen 100, whereby a user may perform touch operations on the map area 110 and the operation button area 120.

A map including the imaging location is displayed on the map area 110. Further, imaging data marks 112 (shown as black circles on the selection screen 100) are displayed on the map on the map area 110. The imaging data marks 112 show the imaging position of the imaging data and are displayed at positions on the map corresponding to the image position information (latitude and longitude) appended to the imaging data. The user may select the imaging data marks 112 by performing a touch operation (specifically, a tracing operation) on the map area 110. Thereby, imaging data corresponding to the imaging data marks 112 selected by the tracing operation are reproduced.

The operation button area 120 includes a reduction button 122, an enlargement button 124 and a confirm button 126, which may be pressed by the user. The reduction button 122 and the enlargement button 124 change the scale of the map displayed on the map area 110 when pressed by the user. In this manner, the location where the reproduced imaging data was imaged may be entirely displayed within the map area 110. For example, the confirm button 126 is a button for deciding the selection according to the above-described tracing operation and performing reproduction.

Next, a selection method of imaging data related to a first comparative example will be described. Here, as shown in FIG. 2, a plurality of imaging data marks 112 are displayed on the map in the map area 110. In this state, to reproduce desired imaging data, a user performs a tracing operation from a tracing start position 132 to a tracing finish position 134, as shown in FIG. 2 for example. In this manner, a reproduction range designation line 136, which designates imaging data of a reproduction target from among a plurality of displayed imaging data, is set.

By pressing the confirm button 126 after performing the tracing operation, the user sets the reproduction range designation area 138 including a certain area of the periphery of the reproduction range designation line 136. In this manner, imaging data, which correspond to imaging data marks 112 included inside the reproduction range designation area 138, are selected as a reproduction target. Subsequently, the selected imaging data are reproduced in sequence.

FIG. 3 is a view illustrating a selection screen relating to a second comparative example. The configuration of the selection screen 100 shown in FIG. 3 is the same as that of the selection screen shown in FIG. 2. In the second comparative example, the setting method of the reproduction range designation area 138 is different to the first comparative example.

That is, in the first comparative example, a certain area of the periphery of the reproduction range designation line 136 was taken as the reproduction range designation area 138. In contrast, in the second comparative example, after the reproduction range designation line 136 is set so that the tracing start position 132 and the tracing finish position 134 coincide as shown in FIG. 3, the area inside the reproduction range designation line 136 is set as the reproduction range designation area 138. In this manner, imaging data, which correspond to all of the imaging data marks 112 within the reproduction range designation line 136, are selected as a reproduction target.

Here, in the selection methods relating to the first comparative example and second comparative example described above, there is a possibility that imaging data which are not intended for reproduction will end up being selected. For example, in a case where the intention is to reproduce only data imaged that day from among data imaged at a location where imaging is frequently performed, such as a home, when the reproduction range designation area 138 is set to include the home, all of the data imaged at the home end up being reproduced. For this reason, in a case where there is a large amount of imaging data to which the same imaging position information is associated, it is difficult to reproduce only arbitrary imaging data.

Further, in a case where there is a large amount of imaging data included in the reproduction range designation area 138, it takes a long time to reproduce all of the imaging data and there is a possibility that the scene desired to be viewed may not readily be reproduced. For this reason, depending on the setting of the reproduction range designation area 138, it is difficult to reproduce an arbitrary scene.

(2-2. Selection Method of Image Data Related to the Embodiment)

To solve the problems in the comparative examples 1 and 2 described above, in the embodiment, the reproduction of imaging data included in the reproduction range designation area 138 is variable in accordance with the tracing speed from the tracing start position 132 to the tracing finish position 134. In this manner, in respect to the imaging data in the reproduction range designation area 138, it is possible to perform reproduction better reflecting the intention of a user by, for example, lengthening or shortening the reproduction time of each item of imaging data, or changing the order of the reproduction. Below, in regards to the imaging data selection method related to the embodiment, description will be given using two embodiments as examples.

(First Embodiment)

Figure 4:
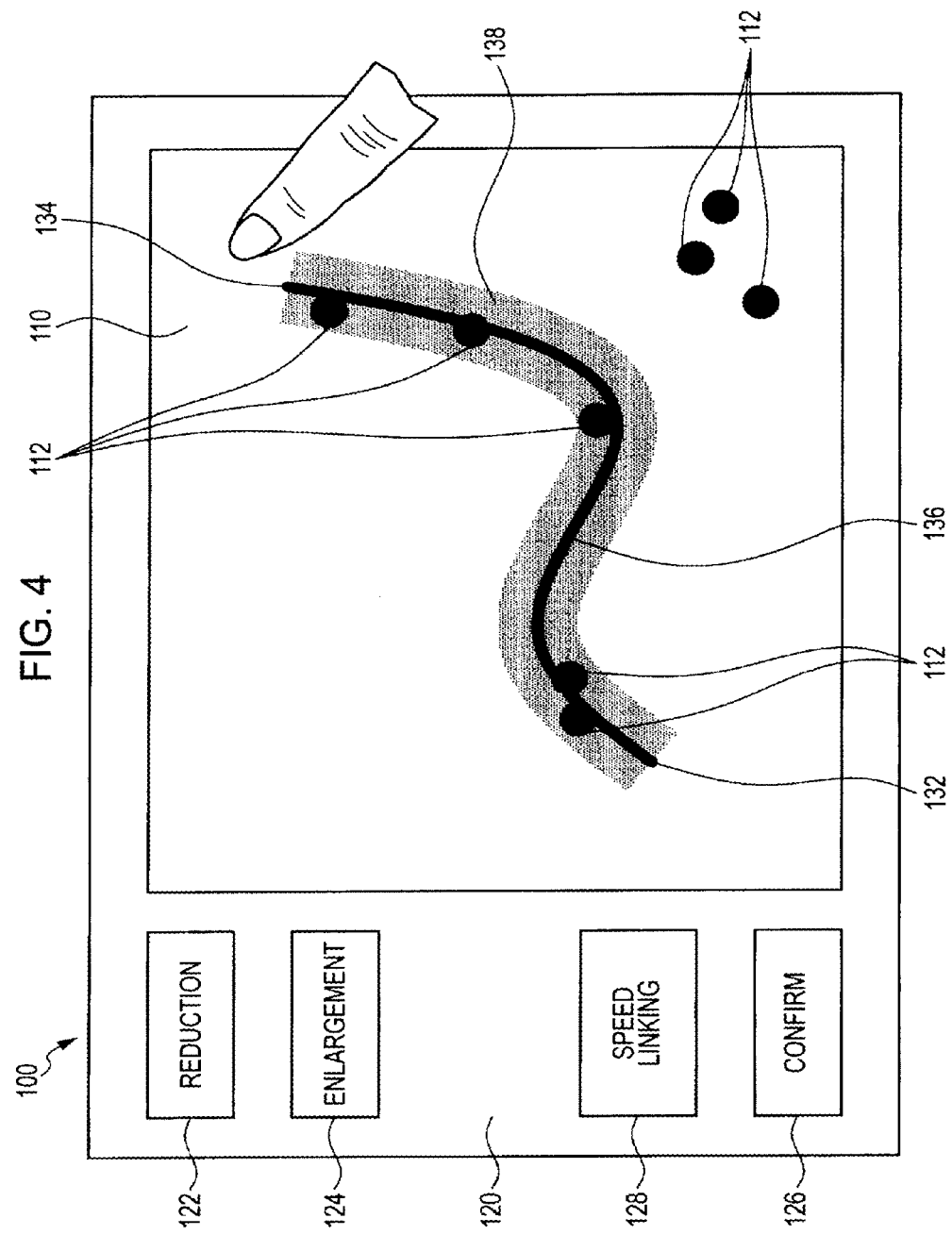
FIG. 4 is a view illustrating a selection screen relating to a first embodiment.

FIG. 4 is a view illustrating a selection screen relating to a first embodiment. The screen configuration of the selection screen 100 illustrated in FIG. 4 is the same as the selection screen 100 of FIG. 2 and FIG. 3 except for the fact that a speed linking button 128 is included in the operation button area 120.

Here, instead of the confirm button 126, the speed linking button 128 is pressed to perform reproduction of imaging data of a reproduction target after a tracing operation is performed. When the speed linking button 128 is pressed, the imaging data included in the reproduction range designation area 138 is reproduced in accordance with the tracing speed of the tracing operation. Here, in a case where the confirm button 126 is pressed without pressing the speed linking button 128, the imaging data reproduction described in FIG. 2 and FIG. 3 is performed.

In the first embodiment, in accordance with the average speed of the tracing operation from the tracing start position 132 to the tracing finish position 134, the reproduction time of the imaging data can be varied, and the data to be reproduced can be varied. The average speed is calculated based on the operation time from the tracing start position 132 to the tracing finish position 134 and the distance between the two positions 132 and 134.

First, description will be given regarding a case where the reproduction time of the imaging data is varied in accordance with the average speed of the tracing operation. Here, the imaging data are moving images and the reproduction system is one of highlight reproduction in which each moving image highlighted scene is reproduced. For example, in a case where there is a large amount of imaging data included in the reproduction range designation area 138, when all of the imaging data are reproduced, the reproduction time ends up becoming long. Here, the number of highlighted scenes extracted from each item of imaging data (moving images) included in the reproduction range designation area 138 is varied in accordance with the average speed of the tracing operation.

Specifically, in a case where the average speed is faster than a predetermined threshold as a result of quickly tracing the map area 110, the number of extracted highlighted scenes is reduced and the reproduction time of the imaging data is shortened. Conversely, in a case where the average speed is slower than a predetermined threshold as a result of slowly tracing the map area 110, the number of extracted highlighted scenes is increased and the reproduction time of the imaging data is lengthened. For this reason, in the case where a user wants to quickly view the imaging data included in the reproduction range designation area 138 as a whole, tracing should be performed quickly on the map area 110, and in the case of less hurried viewing, tracing should be performed slowly on the map area 110. In this manner, it is possible to perform setting in line with the intention of the user in regard to the time taken for the reproduction of data. Here, there may be a plurality of two or more thresholds, and, in such a case, the reproduction time may be finely adjusted.

Next, description will be given in regards to a case of varying the imaging data to be reproduced in accordance with the average speed of a tracing operation. For example, in a case where the intention is to reproduce only data imaged that day from among data imaged at a location where imaging is frequently performed, such as a home, when the reproduction range designation area 138 is set to be the home, all of the data imaged at the home end up being reproduced. Thus, the imaging data to be reproduced from among the data included in the reproduction range designation area 138 are varied in accordance with the average speed of the tracing operation.

Specifically, in a case where the average speed is fast as a result of tracing the map area 110 quickly, only imaging data having a recent date and time is reproduced from among the data included in the reproduction range designation area 138. Conversely, in a case where the average speed is slow as a result of tracing the map area 110 slowly, only imaging data having an old date and time is reproduced from among the data included in the reproduction range designation area 138. In this manner, even in a case where there is a large amount of data having the same imaging position information, the imaging data to be reproduced can be narrowed down by the date and time, and, as a result, it becomes possible to reproduce only the imaging data that the user wishes to reproduce.

Here, in the first embodiment, in a case of reproducing a plurality of imaging data, reproduction is performed in order from imaging data near the tracing start position 132, for example. However, the embodiment is not limited thereto, and, for example, reproduction may be performed in order from imaging data near the tracing finish position 134, reproduction may be performed in order from imaging data of a portion in which there is a lot of data, or reproduction may be performed in order from imaging data near the reproduction range designation line 136.

Further, the first embodiment can also be applied to the case of the reproduction range designation area 138 shown in FIG. 3. That is, according to the speed of the tracing operation in respect to the reproduction range designation area 138 of FIG. 3, the reproduction time may be changed and the imaging data for reproduction (imaging data with a recent date and time or old imaging data) may be confirmed. Also in such a case, for example, reproduction may be performed in order from imaging data positioned at the center of the area, or reproduction may be performed in order from the portion of imaging data where there is a high concentration of imaging data.

(Second Embodiment)

Figure 5:
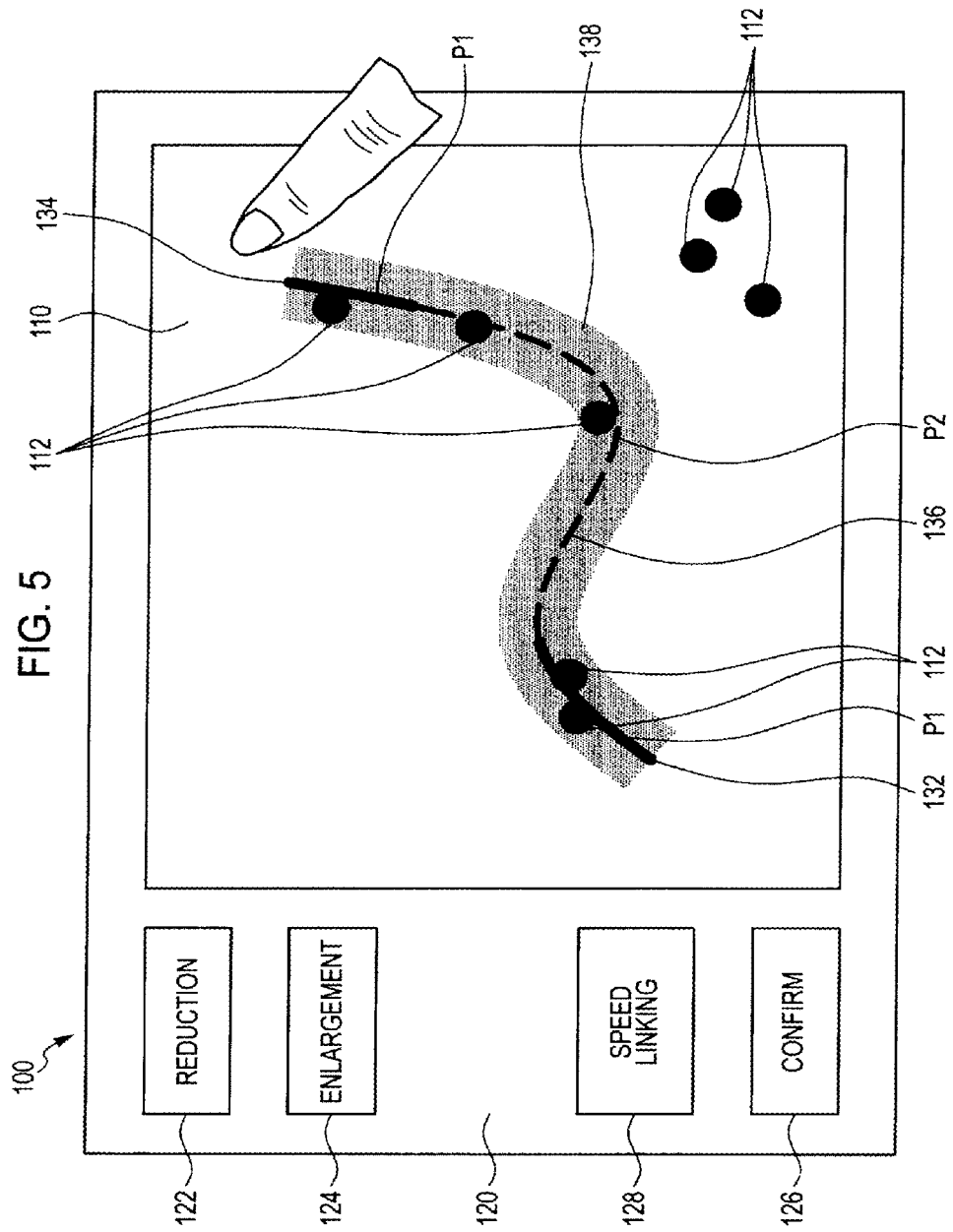
FIG. 5 is a view illustrating a selection screen relating to a second embodiment.

FIG. 5 illustrates a selection screen relating to a second embodiment. The configuration of the selection screen 100 shown in FIG. 5 is the same as the selection screen 100 of FIG. 4.

In the second embodiment, a portion P1 (solid line portion in FIG. 5), which is traced slowly, and a portion P2 (dotted line portion), which is traced quickly, are identified within the reproduction range designation line 136. Thus, based on the identification result, the order of the imaging data corresponding to portion P1 and the imaging data corresponding to portion P2 may be varied and the priority of the imaging data to be reproduced may be differentiated.

First, description will be given of a case where the order of the imaging data to be reproduced is varied. For example, in the case where there is a large amount of imaging data included in the reproduction range designation area 138, when all the imaging data are reproduced, the reproduction time ends up becoming long and there is a possibility that the imaging data that the user wishes to see may not easily be reproduced. Here, after the imaging data corresponding to (close to) portion P1 is reproduced, the imaging data corresponding to (close to) portion P2 is reproduced.

Specifically, taking FIG. 5 as an example, after first reproducing the imaging data which are close to the solid line (P1) of the reproduction range designation line 136 in the data in the reproduction range designation area 138, the imaging data which are close to the dotted line (P2) of the reproduction range designation line 136 are reproduced. In this manner, the order of the imaging data to be reproduced may be set according to the preferences of the user.

Next, description will be given regarding a case of differentiating the priority of the imaging data to be reproduced. For example, in a case where there is a large amount of imaging data included in the reproduction range designation area 138, when all of the imaging data are reproduced, the reproduction time when performing highlight reproduction ends up becoming long. Here, a link is made with the tracing speed of the line when setting the reproduction designation line 136, and the number of highlighted scenes to be extracted from each item of imaging data is varied.

Specifically, the highlighted scenes to be extracted from the imaging data which are close to the solid line of the reproduction range designation line 136 in the data within the reproduction range designation area 138 are increased, and the highlighted scenes to be extracted from the imaging data which are close to the dotted line are decreased. In this manner, it is possible to prioritize the reproduction of the imaging data that the user wishes to view in the highlight reproduction.

<3. Reproduction Process of Imaging Data Linked to the Speed of a Tracing Operation when Imaging Data Selection>

Figure 6:
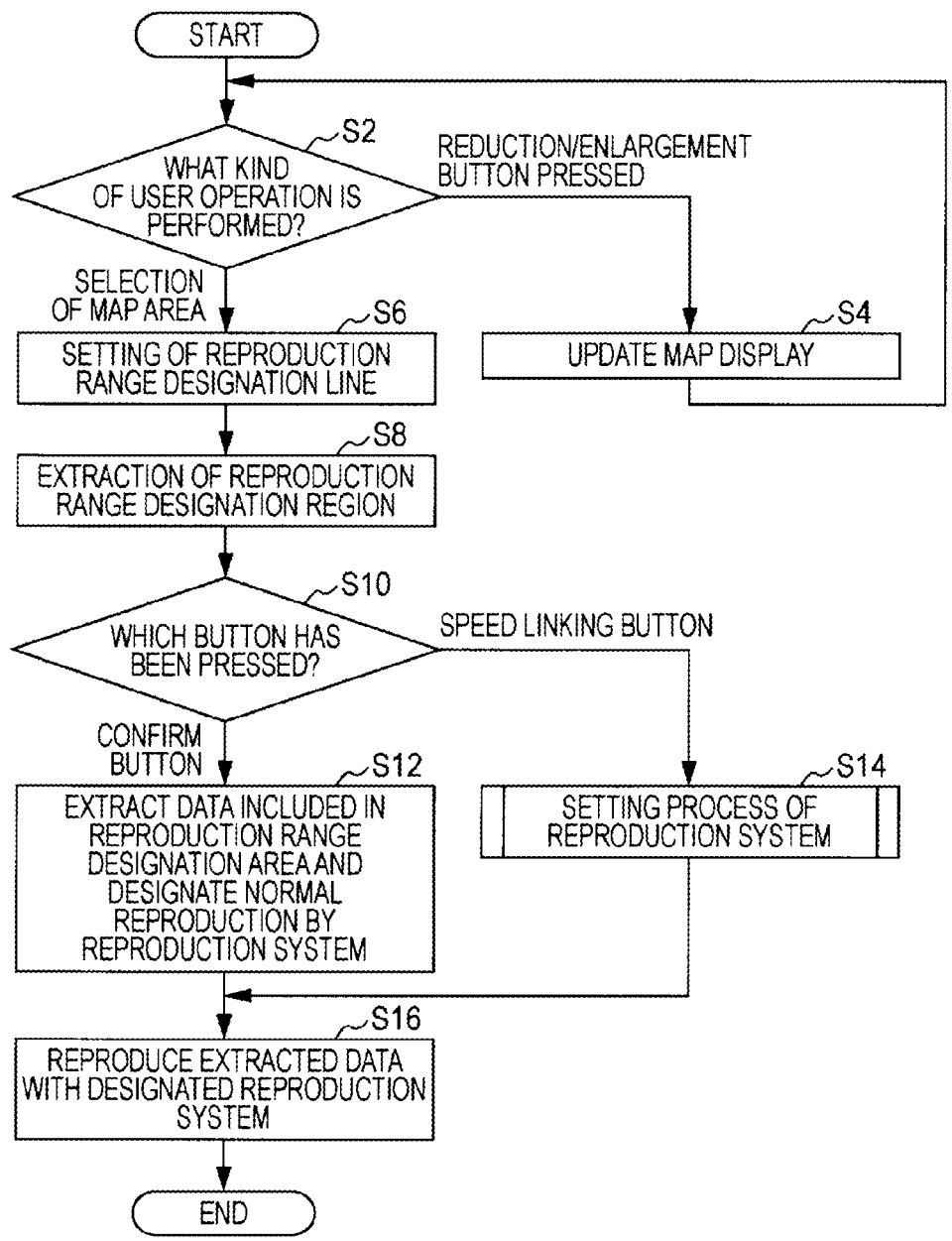
FIG. 6 is a flowchart describing a reproduction process of imaging data linked to the speed of a tracing operation.

Next, description will be given regarding the reproduction processing method of the imaging data linked to the tracing operation speed when selecting the imaging data of a reproduction target, while referring to FIG. 6. FIG. 6 is a flowchart describing a reproduction process of imaging data linked to the speed of a tracing operation.

This process is implemented as a result of the CPU of the control unit 22 executing a program stored in the ROM. The flowchart of FIG. 6 starts from a state where the selection screen 100 is displayed on the display unit 18.

First, in a state where the selection screen 100 including the map display is displayed, the user performs a touch operation on the touch panel 20. Next, the operation detection unit 42 detects the kind of operation performed by the user (step S2).

In a case where the reduction button 122 or the enlargement button 124 of the operation button area 120 of the selection screen 100 has been pressed, the display control unit 41 updates the displayed map display (step S4). Meanwhile, in a case where the user has performed a touch operation on the map area 110 to select imaging data of a reproduction target, the data specification unit 43 sets a reproduction range designation line 136 (step S6).

Next, the data specification unit 43 extracts the reproduction range designation area 138, based on the set reproduction range designation line 136 (step S8). In this manner, the reproduction range designation area 138 shown in FIG. 4 and the reproduction range designation area 138 shown in FIG. 5 are extracted.

After performing the tracing operation, the user presses the confirm button 126 to reproduce the imaging data or the speed linking button 128. When the user presses a button, the operation detection unit 42 detects which of the confirm button 126 and the speed linking button 128 has been pressed (step S10).

Here, the confirm button 126 tends to be pressed in a case where the amount of imaging data included within the reproduction range designation area 138 is small (for example, a case where there is one item of imaging data), whereas the speed linking button 128 tends to be pressed in a case where the amount of imaging data included within the reproduction range designation area 138 is large (for example, a case where there is a plurality of two or more items of imaging data). This is because, when there is only one item of imaging data, even when normal reproduction is performed, the user is not easily inconvenienced; however, in contrast, in the case of a plurality of imaging data, the desired imaging data is to be reproduced quickly. However, the speed linking button 128 may also be pressed in the case of one item of imaging data.

In the case where the confirm button 126 has been pressed, the data specification unit 43 extracts all the imaging data within the reproduction range designation area 138 as imaging data to be reproduced, and the reproduction control unit 46 designates normal reproduction as the reproduction system (reproduction system shown in FIG. 2 and FIG. 3) (step S12). Thus, the reproduction control unit 46 reproduces all of the imaging data within the reproduction range designation area 138 with normal reproduction (step S16).

Figure 7:
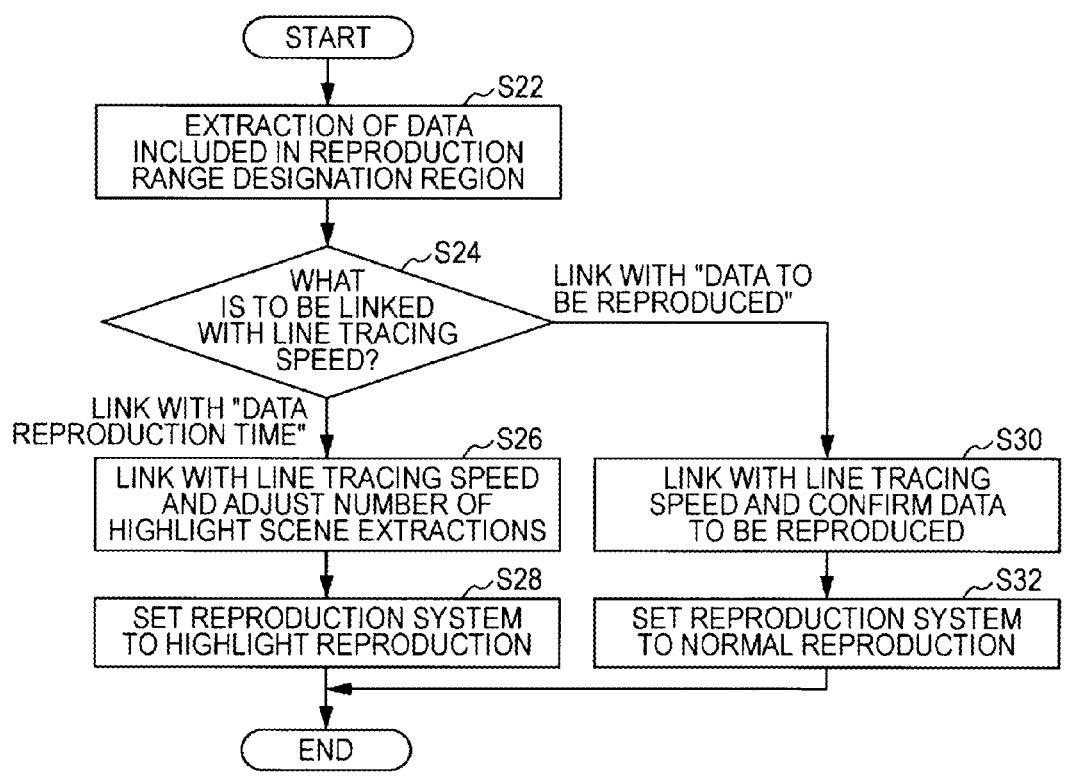
FIG. 7 is a flowchart describing a setting process of a reproduction system linked to the speed of a tracing operation.
Figure 8:
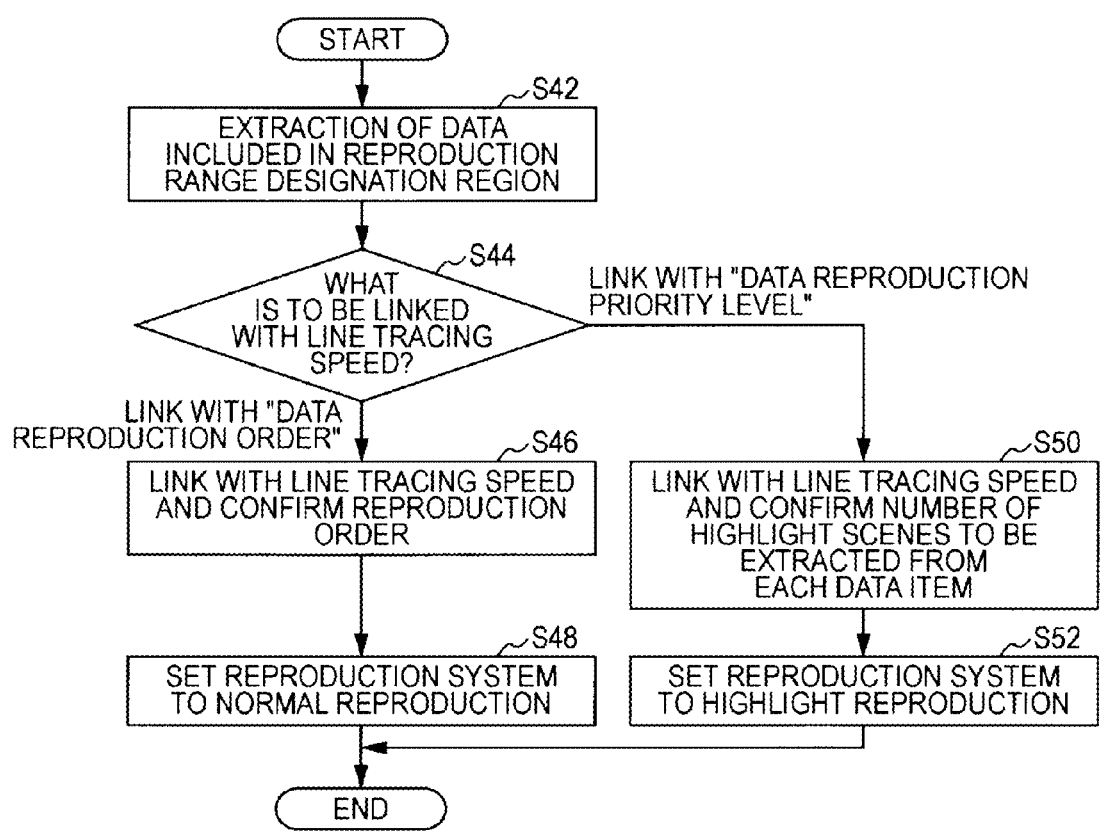
FIG. 8 is a flowchart describing a setting process of a reproduction system linked to the speed of a tracing operation.

On the other hand, in the case where the speed linking button 128 has been pressed, the control unit 22 executes the setting process of FIG. 7 or FIG. 8 as the setting process of the reproduction system in which a link is made to the speed of the tracing operation (step S14). The user may set in advance which of the setting process of FIG. 7 and the setting process of FIG. 8 is to be executed.

First, description will be given regarding the setting process of FIG. 7. FIG. 7 is a flowchart describing a setting process of a reproduction system linked to the speed of a tracing operation. This setting process corresponds to the first embodiment described in FIG. 4.

The data specification unit 43 extracts the imaging data included in the reproduction range designation area 138 (step S22). In the first embodiment, as described above, the reproduction time of the imaging data is varied, or the imaging data to be reproduced is confirmed, in accordance with the average speed of the tracing operation from the tracing start position 132 to the tracing finish position 134. The user may set in advance whether the reproduction time is varied by making a link to the average speed of the tracing operation or whether the imaging data to be reproduced is varied.

The reproduction control unit 46 determines whether setting has been made to vary the reproduction time of the imaging data, or to vary the imaging data to be reproduced (step S24). In the case where the reproduction time of the imaging data is varied, the reproduction control unit 46 confirms the reproduction time of the imaging data by making a link to the value of the average speed of the tracing operation and setting the number of highlighted scenes to be extracted from each item of imaging data (step S26). Further, the reproduction control unit 46 sets the reproduction system to the highlight reproduction (step S28).

Thereafter, the reproduction control unit 46 returns to the flowchart of FIG. 6 and reproduces the imaging data in the set reproduction system (step S16). Specifically, in a case where the average speed is fast as a result of quickly tracing the map area 110, the reproduction control unit 46 reduces the number of highlighted scenes to be extracted and reproduces the imaging data in a short reproduction time. Conversely, in a case where the average speed is slow as a result of slowly tracing the map area 110, the reproduction control unit 46 increases the number of highlighted scenes to be extracted and performs highlight reproduction of the imaging data in a long reproduction time.

In a case where the imaging data to be reproduced is varied in step S24 of FIG. 7, the reproduction control unit 46 makes a link to the size of the average speed of the tracing operation and confirms the imaging data to be reproduced (step S30). Further, the reproduction control unit 46 sets the reproduction method to be normal reproduction (step S32). Thereafter, the reproduction control unit 46 returns to the flowchart of FIG. 6 and reproduces the imaging data with the set reproduction system (step S16).

Specifically, in a case where the average speed is fast as a result of quickly tracing the map area 110, the reproduction control unit 46 reproduces only the data with a recent imaging date and time from among the data included in the reproduction range designation area 138. Conversely, in a case where the average speed is slow as a result of slowly tracing the map area 110, the reproduction control unit 46 reproduces only the data with an old imaging date and time from among the data included in the reproduction range designation area 138.

Next, description will be given in regard to the process shown in FIG. 8. FIG. 8 is a flowchart describing a setting process of a reproduction system linked to the speed of a tracing operation. This setting process corresponds to the second embodiment described in FIG. 5.

The data specification unit 43 extracts the imaging data included in the reproduction range designation area 138 (step S42). In the second embodiment, a slowly traced portion P1 (a solid line portion in FIG. 5) and a quickly traced portion P2 (a dotted line portion) are identified in the reproduction range designation line 136, the reproduction order of the imaging data corresponding to portion P1 and the imaging data corresponding to portion P2 is varied and differentiation is made in the priority of the imaging data to be reproduced. Here, the user may set in advance whether the link is made to the average speed of the tracing operation and the reproduction order is changed, or whether differentiation is made in the priority of the imaging data.

The reproduction control unit 46 determines whether setting is performed so that the reproduction order of the imaging data is varied, or so that differentiation is made in the priority of the imaging data (step S44). In a case where the reproduction order of the imaging data is differentiated, the reproduction control unit 46 confirms the reproduction order of the imaging data, based on the identification result of the portion P1 and the portion P2 (step S46). Further, the reproduction control unit 46 sets the reproduction system to normal reproduction (step S48).

Thereafter, the reproduction control unit 46 returns to the flowchart of FIG. 6 and reproduces the imaging data in the predetermined reproduction order with the set reproduction system (step S16). Specifically, after first reproducing the imaging data which are close to the solid line of the reproduction range designation line 136 from among the data within the reproduction range designation area 138, the reproduction control unit 46 reproduces the imaging data which are close to the dotted line of the reproduction range designation line 136.

In the case where the priority of the imaging data is differentiated in step S44 of FIG. 8, the reproduction control unit 46 confirms the number of highlighted scenes to be extracted from each item of imaging data based on the identification result of portion P1 and portion P2 (step S50). Further, the reproduction control unit 46 sets the reproduction system to highlight reproduction (step S52). Thereafter, the reproduction control unit 46 returns to the flowchart of FIG. 6 and reproduces the imaging data in the predetermined reproduction order with the set reproduction system (step S16).

Specifically, the reproduction control unit 46 increases the highlighted scenes to be extracted from the imaging data which are close to the solid line of the reproduction range designation line 136 from among the data within the reproduction range designation area 138, decreases the highlighted scenes to be extracted from the imaging data which are close to the dotted line, and performs highlight reproduction.

In the above description, the user may perform setting in advance in regard to which of the setting processes of FIG. 7 and FIG. 8 is executed; however, the disclosure is not limited thereto. For example, the control unit 22 may be set to perform the setting process of FIG. 7 in a case where the detected speed change of the tracing operation is low, and perform the setting process of FIG. 8 in a case where the speed change is large. In such a case, an appropriate reproduction system is automatically set based on the tracing operation.

Further, in the above description, one of the setting processes of FIG. 7 and FIG. 8 is executed; however, the disclosure is not limited thereto. For example, the setting processes of FIG. 7 and FIG. 8 may be set to be executed in combination.

<4. Effectiveness of the Imaging Apparatus Related to the Embodiment>

According to the imaging apparatus 10 related to this embodiment, in a case where imaging data to be reproduced are selected from a map area 110 of a selection screen 100, reproduction better reflecting the intentions of a user is made possible by making a link with the speed of a tracing operation and setting the imaging data to be reproduced and the reproduction method.

That is, it is possible to adjust the reproduction time by making a link to the average speed of a tracing operation from a tracing start position 132 to a tracing finish position 134 and varying the imaging data to be reproduced. Specifically, it is possible to set the reproduction time of the imaging data in line with the preferences of a user by making a link with the average speed of a tracing operation and varying the number of highlighted scene extractions. Further, it is possible to reproduce only the imaging data that a user wishes to reproduce by making a link with the average speed of a tracing operation and varying the imaging data to be reproduced.

Further, it is possible to reproduce the imaging data and scenes that a user wishes to reproduce with priority by making a link with the speed of a portion in a tracing operation and varying the reproduction order of the imaging data and the number of highlighted scenes to be extracted from each item of imaging data.

<5. Other Embodiments>

In the above, detailed description was made in regard to preferable embodiments of the disclosure while referencing the attached figures; however, the disclosure is not limited thereto. It is understood that, within the scope of the technical concept described in the disclosure, a person having ordinary skill in the technical field will naturally be able to conceive of alterations or modifications thereto, all of which naturally belong to the technical range of the disclosure.

In the above-described embodiment, an imaging apparatus is described as an example of a reproduction processing apparatus; however, the disclosure is not limited thereto. The reproduction processing apparatus may have a function of reproducing stored imaging data, and, for example, may be a mobile phone apparatus, a PDA, a gaming device, an electronic dictionary, a notebook PC or the like. Further, the reproduction processing apparatus may not have an imaging unit.

Further, in the above embodiment, description has been made regarding a case of displaying selectable imaging data on a map screen; however, the disclosure is not limited thereto. For example, a desired thumbnail image may be selected from a plurality of thumbnail images of moving images displayed to be selectable on the selection screen. In this manner, any arbitrary screen may be used as long as the selection screen may select desired image data from among a plurality of image data.

Further, in the above embodiment, it is described that the operation detection unit detects a tracing operation of a user on a touch panel; however, the disclosure is not limited thereto. For example, a cursor operation by a mouse or the like on the selection screen may be detected.

Further, the series of processes described in the above embodiment may be performed by dedicated hardware, or performed by software (an application). In a case where the series of processes is executed by software, the above series of processes may be realized by executing a program with a general use computer or a dedicated computer.

Further, the steps shown in the flowchart of the above embodiment may of course be processed in a time-series manner following the above-mentioned order; however, the processes are not necessarily performed in a time-series manner, but may also be performed in parallel or discretely. Also, even in the case of steps which are processed in a time-series manner, it is needless to say that it is possible to change the order appropriately as necessary.

It should be understood by those skilled in the art that various modifications, combinations, sub-combinations and alterations may occur depending on design requirements and other factors insofar as they are within the scope of the appended claims or the equivalents thereof.

It should be noted that the present disclosure can also take the following configurations.

[1] A reproduction processing apparatus comprising:
a display control unit displaying a plurality of reproducible imaging data on a display unit so as to be individually selectable;
an operation detection unit detecting a selection operation according to an operation body of the displayed imaging data;
a data specification unit specifying imaging data as a reproduction target from among the plurality of imaging data displayed on the display unit, based on the selection operation of the operation body;
an operation state detection unit detecting an operation state when the operation body is operated to select the imaging data specified by the data specification unit; and
a reproduction control unit controlling reproduction of the specified imaging data according to the operation state detected by the operation state detection unit.

[2] The reproduction processing apparatus according to [1], further comprising:
a storage unit storing the imaging data so as to correspond to imaging position information,
wherein the display unit displays the plurality of imaging data so as to be selectable on the display unit based on each item of the imaging position information.

[3] The reproduction processing apparatus according to [1],
wherein the operation detection unit detects a series of touch operations of operation bodies on the display unit in order to select the imaging data, and
the operation state detection unit detects the movement speed of the series of touch operations as the operation state.

[4] The reproduction processing apparatus according to [3], further comprising:
an identification unit identifying a first operation portion in which the movement speed in the series of touch operations is slow and a second operation portion in which the movement speed is fast,
wherein the data specification unit specifies imaging data of two or more reproduction targets, and
the reproduction control unit performs control so as to separate reproduction of imaging data corresponding to the first operation portion identified in the specified imaging data by the identification unit and reproduction of imaging data corresponding to the second operation portion.

[5] The reproduction processing apparatus according to [4],
wherein the reproduction control unit reproduces the imaging data, which correspond to the first operation portion identified in the two or more items of specified imaging data by the identification unit, ahead of imaging data corresponding to the second operation portion.

[6] The reproduction processing apparatus according to [4],
wherein the reproduction control unit makes a reproduction time of imaging data corresponding to the first operation portion identified in the two or more items of specified imaging data by the identification unit longer than a reproduction time of imaging data corresponding to the second operation portion.

[7] The reproduction processing apparatus according to [3],
wherein the operation state detection unit detects an average movement speed of the series of touch operations as the movement speed,
the data specification unit specifies imaging data of two or more reproduction targets, and
the reproduction control unit controls reproduction of specified imaging data, based on the average movement speed detected by the operation state detection unit.

[8] The reproduction processing apparatus according to [7],
wherein the reproduction control unit lengthens a reproduction time of specified imaging data when the average movement speed is slow and shortens a reproduction time of specified imaging data when the average movement speed is fast.

[9] The reproduction processing apparatus according to [7], further comprising:
a storage unit storing the imaging data so as to correspond to an image date and time,
wherein the reproduction control unit reproduces imaging data with an older imaging date and time in two or more specified imaging data items when the average movement speed is slow; and reproduces imaging data with a more recent imaging date and time when the average movement speed is fast.

[10] An imaging apparatus comprising:
an imaging unit;
a display control unit displaying a plurality of reproducible imaging data so as to be individually selectable;
an operation detection unit detecting a selection operation according to an operation body of the displayed imaging data;
a data specification unit specifying imaging data as a reproduction target from among the plurality of imaging data displayed on the display unit, based on the selection operation of the operation body;
an operation state detection unit detecting an operation state when the operation body is operated to select the imaging data specified by the data specification unit; and
a reproduction control unit controlling reproduction of the specified imaging data according to the operation state detected by the operation state detection unit.

[11] A reproduction processing method comprising:
displaying a plurality of reproducible imaging data so as to be individually selectable;
detecting a selection operation according to an operation body of the displayed imaging data;
specifying imaging data as a reproduction target from among the plurality of displayed imaging data, based on the selection operation of the operation body;
detecting an operation state when the operation body is operated to select the specified imaging data; and
controlling reproduction of the specified imaging data according to the detected operation state.

[12] A program causing a computer to execute:
displaying a plurality of reproducible imaging data so as to be individually selectable;
detecting a selection operation according to an operation body of the displayed imaging data;
specifying imaging data as a reproduction target from among the plurality of displayed imaging data, based on the selection operation of the operation body;
detecting an operation state when the operation body is operated to select the specified imaging data; and
controlling reproduction of the specified imaging data according to the detected operation state.

What is claimed is:

1. An apparatus, comprising:
a display controller circuit that controls display of a map and a plurality of marks on the map, each mark corresponding to a different image of a plurality of images, and each mark being displayed on the map at a position corresponding to location information of the corresponding image of the respective mark;
a detecting circuit that
detects a user input from a user, the user input being a continuous input on the map,
sets a selection range of the plurality of marks on the map based on the user input, and
determines a number of the plurality of images for reproduction of the plurality of images within the selection range according to a speed of tracing operation from the user input; and
a reproduction circuit that reproduces the number of the plurality of images.

2. The apparatus according to claim 1, further comprising a storage circuit that stores the plurality of images.

3. The apparatus according to claim 1, wherein the reproduction circuit changes at least one of an order of the images, the number of the plurality of images, a duration of reproduction of the images, or a date indicating which images are to be reproduced when the speed of tracing operation from the user input is changed.

4. The apparatus according to claim 1, further comprising a receiving circuit that receives the user input, the user input being a path traced by the user on the map.

5. The apparatus according to claim 4, wherein the reproduction circuit reproduces images corresponding to marks within a threshold distance of the path traced by the user on the map.

6. The apparatus according to claim 4, wherein the reproduction circuit reproduces the images in an order based on the path.

7. The apparatus according to claim 4, wherein the receiving circuit further receives data including a speed of tracing of the path by the user as speed information.

8. The apparatus according to claim 7, further comprising:
an identification circuit that identifies a first operation portion and a second operation portion of the path, a speed of tracing of the path in the first operation portion being different than a speed of tracing of the path in the second operation portion, wherein
the reproduction circuit separately reproduces, based on the speed information, images corresponding to marks near the first operation portion and images corresponding to marks near the second operation portion.

9. The apparatus according to claim 7, further comprising:
an identification circuit that identifies a first operation portion and a second operation portion of the path, a speed of tracing of the path in the first operation portion being less than a speed of tracing of the path in the second operation portion, wherein
the reproduction circuit reproduces, based on the speed information, images corresponding to marks near the first operation portion for a longer period of time than the reproduction circuit reproduces images corresponding to marks near the second operation portion.

10. The apparatus according to claim 7, wherein
the receiving circuit further receives data including an average movement speed of a touch operation tracing the path by the user, and
the reproduction circuit reproduces the number of the plurality of images based on the average movement speed.

11. The apparatus according to claim 10, wherein
the reproduction circuit increases a period of time of reproduction of images corresponding to marks near the path when the average movement speed decreases, and
the reproduction circuit decreases the period of time of reproduction of images corresponding to marks near the path when the average movement speed increases.

12. The apparatus according to claim 7, wherein the reproduction circuit reproduces the images, based on the speed information, such that recent images along an area of the path with a high speed of tracing are reproduced and older images along an area of the path with a low speed of tracing are reproduced.

13. The apparatus according to claim 7, wherein the reproduction circuit reproduces the images in an order, based on the speed information, such that images along an area of the path with a high speed of tracing are reproduced first and images along an area of the path with a low speed of tracing are reproduced later.

14. The apparatus according to claim 1, wherein
the display controller circuit controls the display of the map on a touch display, and
the detecting circuit detects the user input on the touch display.

15. A digital camera comprising:
imaging circuitry; and
the apparatus according to claim 1.

16. The apparatus according to claim 1, wherein
the location information for a first image includes a latitude and a longitude, and
the reproduction circuit determines whether the location information of the first image is within a threshold distance from a closest position on the map that coincides with the user input.

17. The apparatus according to claim 1, wherein
the user input corresponds to a border of an area of selection, and
the reproduction circuit reproduces images that correspond to marks on the map that are displayed within the border.

18. The apparatus according to claim 1, wherein a first mark, displayed on the map and corresponding to a first image of the plurality of images, is a thumbnail image of the first image.

19. A method, comprising:
controlling, by circuitry, display of a map and a plurality of marks on the map, each mark corresponding to a different image of a plurality of images, and each mark being displayed on the map at a position corresponding to location information of the corresponding image of the respective mark;
detecting, by the circuitry, a user input from a user, the user input being a continuous input on the map;
setting, by the circuitry, a selection range of the plurality of marks on the map based on the user input;
determining, by the circuitry, a number of the plurality of images for reproduction of the plurality of images within the selection range according to a speed of tracing operation from the user input; and
reproducing, by the circuitry, the number of the plurality of images.

20. A non-transitory computer readable medium encoded with a program that, when executed by circuitry, causes the circuitry to:
control display of a map and a plurality of marks on the map, each mark corresponding to a different image of a plurality of images, and each mark being displayed on the map at a position corresponding to location information of the corresponding image of the respective mark;
detect a user input of a user, the user input being a continuous input on the map;
set a selection range of the plurality of marks on the map based on the user input;
determine a number of the plurality of images for reproduction of the plurality of images within the selection range according to a speed of tracing operation from the user input; and
reproduce the number of the plurality of images.

* * * * *